E. Brown,
Shoe Upper.
N° 11,716.  Patented Sep. 26, 1854.
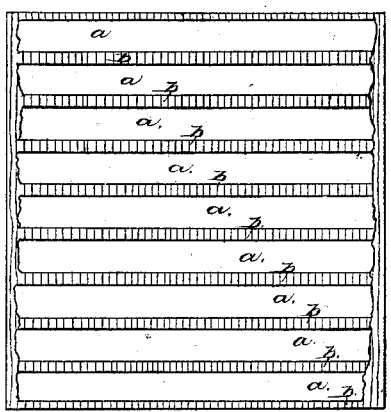
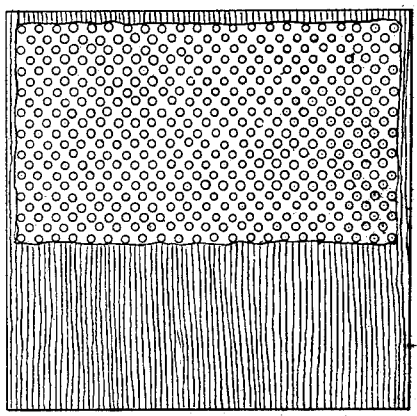
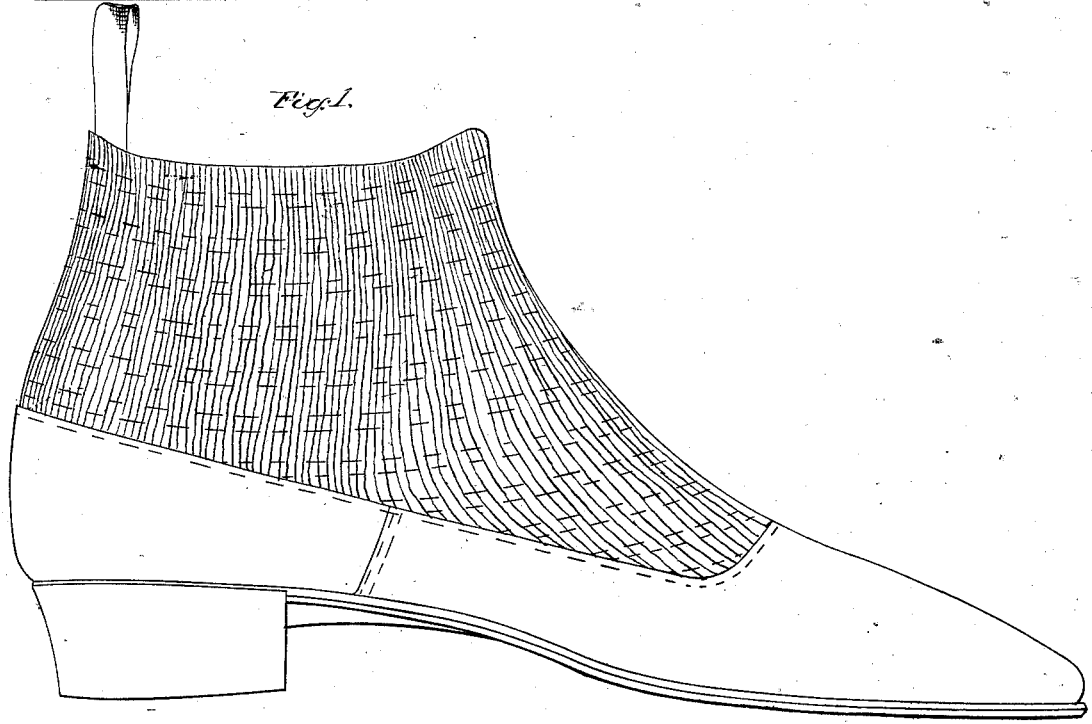

UNITED STATES PATENT OFFICE.

EDWARD BROWN, OF RINDGE, NEW HAMPSHIRE.

ELASTIC GOODS.

Specification of Letters Patent No. 11,716, dated September 26, 1854.

*To all whom it may concern.*

Be it known that I, EDWARD BROWN, of Rindge, in the county of Cheshire and State of New Hampshire, have invented a new and useful Porous Elastic Cloth for Making the Tops of Gaiter-Boots and for other Purposes; and I hereby declare the following to be a full, clear, and exact description of the same, reference being had to the annexed drawings, making part of this specification, in which—

Figure 1 represents a gaiter boot made of the improved material. Figs. 2 and 3 are views which serve to illustrate the process by which the fabric is made, and which will be referred to hereafter.

Various methods have been devised for the purpose of making elastic cloth, all of which have been liable to certain objections when the same is to be made use of in the manufacture of wearing apparel.

The ordinary shirred goods is the most common form of elastic cloth at present in use, but this is entirely impervious to moisture, and also has a rough appearance upon both surfaces, both of which qualities it is desirable to dispense with.

To produce a cloth which while it is elastic shall be perfectly pervious to the perspiration of the body, and which shall have at all times a smooth unshirred surface upon each side, is the object of my present invention, which consists in confining strips of india rubber between two thicknesses of netted fabric, the rubber not being distended before it is secured to the cloth, as is the case with the ordinary shirred goods; and spaces being left between the strips of india rubber for the passage of the perspiration.

To enable others skilled in the art to make and use my invention I will proceed to describe the manner in which I have carried it out.

I take stocking fabric either in a continuous sheet or knitted in the form of the article to be produced, this I cover with strips of india rubber $a$, Fig. 2, leaving spaces $b$, between them of about $\frac{1}{3}$ their width. A suitable cementing material being placed upon both sides of the strips, and not upon the fabric itself; a second thickness of stocking fabric is then applied to the other side of the india rubber strips, and the whole is cemented together by passing between rollers or by any other sufficient means. A fabric is thus produced as seen in Fig. 2, which is at the same time elastic and pervious to moisture, while its surface is as even and smooth upon both sides as the original stocking fabric.

In Fig. 3 is shown a method of making a modification of the above described fabric, in which a perforated sheet of india rubber is used between the two thicknesses of knitted fabric, the perspiration passing off through the perforation in the india rubber.

Fig. 1 illustrates one of the uses to which the above described fabric may be put. It is however obvious that there are other uses to which it may also be applied, and I do not therefore claim this fabric in its application to any particular use.

When the material is required to be thin and light a similar effect may be produced by giving to each of the knitted fabrics previous to putting them together a thin coat of vulcanized india rubber, which is laid on of such a consistence and in such quantity that it shall adhere to the projecting fibers without rendering the cloth impervious to moisture.

What I claim as my invention and desire to secure by Letters Patent, is—

The within described elastic fabric, the india rubber being confined between two thicknesses of stocking work in the manner and for the purpose set forth.

EDWARD BROWN.

Witnesses:
SAM COOPER,
H. B. OSGOOD.